Figure 1:
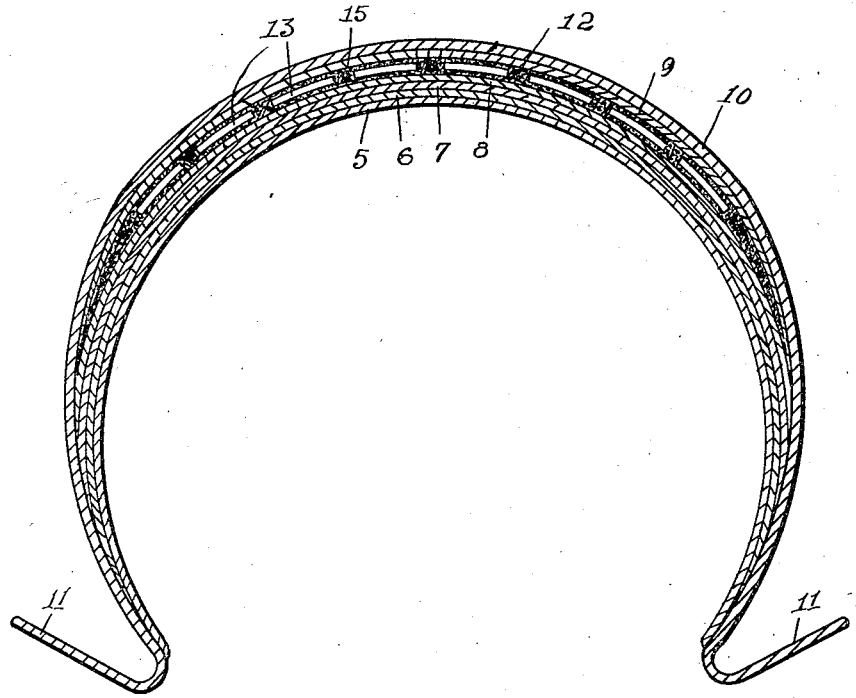

M. C. SEYMOUR.
TIRE BOOT.
APPLICATION FILED DEC. 26, 1919.

1,377,098.  
Patented May 3, 1921.

Inventor  
M. C. Seymour.  
By C. A. Snow & Co.  
Attorneys

UNITED STATES PATENT OFFICE.

MANLY C. SEYMOUR, OF HESPERIA, MICHIGAN.

TIRE-BOOT.

1,377,098.  Specification of Letters Patent.  Patented May 3, 1921.

Application filed December 26, 1919. Serial No. 347,471.

*To all whom it may concern:*

Be it known that I, MANLY C. SEYMOUR, a citizen of the United States, residing at Hesperia, in the county of Oceana and State of Michigan, have invented a new and useful Tire-Boot, of which the following is a specification.

This invention relates to new and useful improvements in tire boots, and more particularly to a boot of this character adapted to be employed in connection with pneumatic tires for strengthening the tire at a point where a blow-out has occurred.

The primary object of the invention is to provide a boot having metallic reinforcing means for securing the boot in proper relation within the tire, thus preventing the air pressure within the tire from forcing the boot through the opening formed in the casing, by the blow-out.

A further object of the invention is to provide a boot of this character which will not fold when once in position, and one which will not creep or uncover the blow-out opening.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 2:
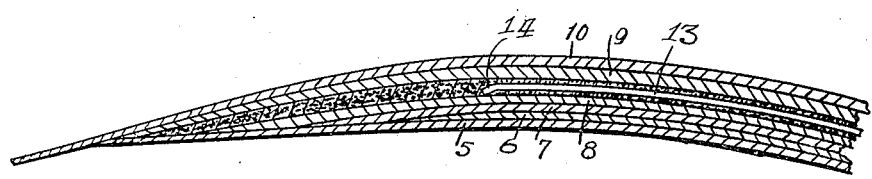

Figure 1 illustrates a transverse sectional view through a tire boot constructed in accordance with the present invention; and Fig. 2 illustrates a fragmental longitudinal sectional view through the tire boot.

Referring to the drawing in detail, the device is shown as including a base portion built up of a plurality of layers of fabric, secured together by suitable cement or other adhesive material, and the layers as shown, are indicated by the reference characters 5, 6, 7 and 8, the layer 5 being the bottom layer or tube engaging layer, and is longer than the remaining layers, each successive layer being of a width less than the width of its adjacent layer, and having its outer edges beveled to eliminate shoulders or enlargements at the point of contact between the layers of the fabric.

The upper portion of the boot is formed of the relatively narrow layer 9, and an outer protecting layer 10 which is of a width to provide lateral extensions 11 by means of which the boot is secured in proper operative relation with the inner tube and casing of the tire in which the boot is positioned.

These layers 8 and 9 are held in spaced relation by means of the rubber spacing element 12 in which are vulcanized the metallic reinforcing strips 13, which extend longitudinally of the boot, and have their ends terminating short of the length of the boot to permit the portions of the fabric layers to engage the inner tube.

These reinforcing strips 13 have their ends turned inwardly as at 14, to provide anchors whereby the reinforcing strips 13 may be securely anchored between the layers of fabric and prevented from movement with relation thereto.

In the formation of a boot of this character, a layer of rubber is positioned on the layer 8 of the fabric, and the metallic reinforcing strips 13 are arranged in proper spaced relation with each other, and disposed longitudinally of the boot proper. A sheet of rubber is then positioned over the metallic reinforcing strips 13, and the outer fabric layers are then positioned over this sheet of rubber.

The boot is vulcanized, while the strips are in this position, with the result that the rubber finds its way between the longitudinal edges of the metallic reinforcing strips 13 to the end that pockets are formed within the rubber spacing element 12, the portions 15, of the rubber spacing element preventing lateral movement of the metallic reinforcing strips 13.

In operation, assuming that an opening is made in a tire, due to the expansion of air within the tire, the tire boot is inserted in the tire, over the inner tube, at the point of the blow-out, the lateral extensions 11 are positioned between the head of the tire casing, and the clencher rim, with the result that the boot is secured in proper relation within the tire.

From the foregoing it is obvious that due to the metal reinforcing strips 14, the air pressure within the tire is prevented from forcing portions of the boot through the opening in the tire or casing.

Having thus described the invention, what is claimed is:—

In a tire boot, a body including a plurality of layers of fabric secured together, a rubber spacing member supported between predetermined members of the fabric, metallic strips continuous throughout the length of the boot, positioned within the rubber spacing member, the metallic strips extending longitudinally of the body and being disposed in transverse spaced relation with each other, and each of said strips having its ends extending downwardly to provide anchors for anchoring the strips in the spacing member.

In testimony that I claim the foregoing as my own, I have hereto affixed my signature in the presence of two witnesses.

MANLY C. SEYMOUR.

Witnesses:
RHODA A. JOHNSON,
ETTA SEYMOUR.